July 5, 1966 M. G. CURRAN 3,258,821
DOUBLE GRIP SAFETY CLAMP
Filed Feb. 5, 1964

INVENTOR
Michael G. Curran

United States Patent Office 3,258,821
Patented July 5, 1966

3,258,821
DOUBLE GRIP SAFETY CLAMP
Michael G. Curran, 11608 Detroit Ave.,
Cleveland, Ohio
Filed Feb. 5, 1964, Ser. No. 342,718
2 Claims. (Cl. 24—243)

This invention relates to tools and, more particularly, to that form of tool that is used to secure any two or more objects together and known in the broad sense as a clamp.

There are uncounted numbers of different types of clamps, depending of course for what the clamp is going to be used. However, all clamps have one thing in common, that is, their jaws, the most important part of this useful tool, as, without jaws that will firmly grip the desired objects of clamping, the tool is of no practical purpose to anyone and, in fact, can become a serious hazard, as clamps having jaws subject to failure can cause serious accidents resulting in death or injury to whoever is using the device or is even within range of whatever it is clamping together.

Clamps are often named for either the type of work they are designed for or else for reasons of describing some particular feature of their design. It is, therefore, rather obvious from the name of the present invention that the main feature of this unique clamp is its double grip.

It is, therefore, the main object of this invention to provide a double grip clamp that will find one of its greatest uses in the construction field and in other industrial fields of endeavor by reason of its unique construction that in the opinion of the inventor makes it the safest clamp ever yet produced by anyone, as will be understood as the description of the invention proceeds.

Another object of this invention is to provide a double grip safety clamp adapted to support a complete scaffold assembly.

Another object of this invention is to provide a double grip safety clamp that in its preferred form and size will weigh only seven pounds and yet support a five-ton load.

Another object of this invention is to provide a double grip safety clamp that has a plurality of clamping screws, each one of which is provided with a number of penetrating cutting points that will firmly grip any object or objects to which it is clamped.

Another object of this invention is to provide a double grip safety clamp that is so designed as to have its gripping surfaces immune to grease and dirt that would otherwise clog up the device and reduce its effective gripping power.

Still another object of this invention is to provide a double grip safety clamp that will continue to firmly grip whatever it is clamped to, even though one of the clamping screws fails or is accidentally damaged, thereby giving additional safety to the device, safety that the applicant is convinced is not available in any other clamp regardless of its construction or size.

With the foregoing and other objects in view which will be made manifest in the following detailed description and specifically pointed out in the appended claims, reference is had to the accompanying drawing, wherein:

Figure 1:
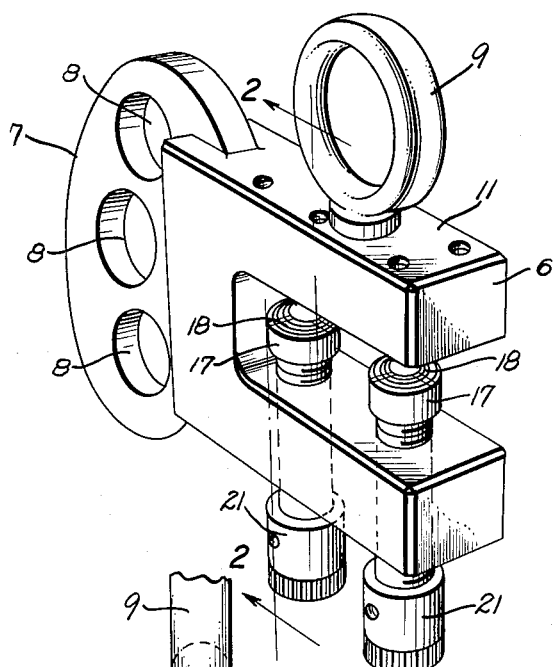
FIGURE 1 is a pictorial view of this invention.
Figure 2:
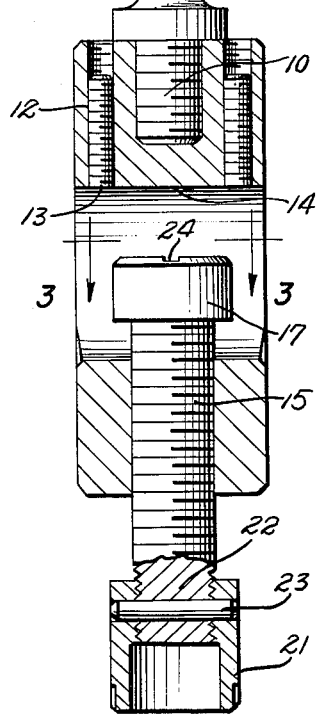
FIGURE 2 is a sectional view of this invention taken along line 2—2 of FIGURE 1.
Figure 3:
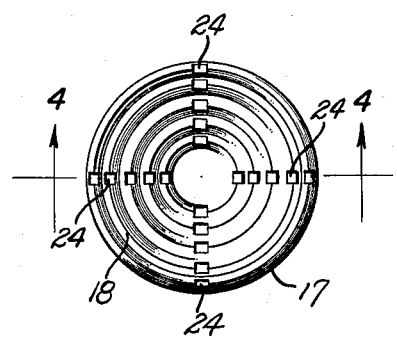
FIGURE 3 is a top view of one of the gripping screws as indicated by the horizontal line and numeral 3—3 on FIGURE 2.
Figure 4:
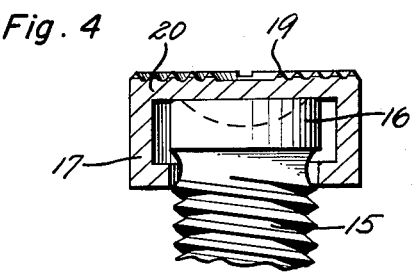
FIGURE 4 is a sectional view of this invention taken along line 4—4 of FIGURE 3.

Referring to the accompanying drawing wherein similar reference characters designate similar parts throughout, the invention embodies a U-shaped frame 6 having an elliptical segment 7 extending outward from the normally vertical portion thereof, as clearly shown in FIGURE 1, where it is also seen that the just mentioned elliptical segment 7 is provided with a plurality of circular openings 8, through which any member may be placed for securement or the handling of this tool. The elliptical segment 7 may or may not be integral with the aforesaid U-shaped frame 6. A lifting ring 9 having a shouldered stud 10 is firmly secured to the top 11 of the U-shaped frame 6 by having the threaded stud 10 screwed into a suitable opening, while the same top 11 of the U-shaped frame 6 is provided with a plurality of equally spaced headless set screws 12 that give additional gripping power to whatever is being clamped when their ends 13 extend beyond the upper surface 14 of the opening in the aforesaid U-shaped frame 6.

A plurality of screws 15 have their upper ends 16 encased in a rubber covered swivel pad 17 having a plurality of equally spaced rings 18 forming inverted V-shaped threads 19 on the upper surface 20 thereof that grip any surface to which the clamp is secured, without the danger of damaging or scarring its surface. An Allen nut 21 is secured to the lower end 22 of each screw 15 by means of the horizontally disposed pin 23 in order to provide a hollow head in which is inserted a socket wrench for the tightening and loosening of the screws 15 that form the major gripping part of this invention. The swivel pad may be of other material such as metal.

From the above described construction of this invention of a double grip safety clamp, one can see that all one has to do is to insert whatever is to be secured by this clamp within the openings in the U-shaped frame 6 between the upper surface of the rubber covered swivel pads 17 of the screws 15 and the ends 13 of the headless set screws 12, and then tighten up the screws 15 by inserting one end of the proper type of wrench in the opening in the Allen nut 21 that is fixed to the lower end of each screw 15, as well as tighten down the aforesaid headless set screws 12.

It is, of course, understood that the circular openings 8 in the elliptical segment 7 of this invention are for the purpose of permitting other things to be secured to this clamp by bolts or by any other desired means of connection. The only feature of this novel invention that has not been so far described are the crosscuts 24 in the inverted V-shaped threads 19 of the swivel pads 17. The purpose of the crosscuts is to act as bleeder recesses that will bleed off dirt and the like that would otherwise clog the aforesaid grooves in the rings of this portion of the invention.

It will, of course, be understood that various details of construction may be varied through a wide range without departing from the principles of this invention, and it is, therefore, not the purpose to limit the patent granted hereon otherwise than necessitated by the scope of the appended claims.

What I now claim as my invention is:
1. A generally U-shaped clamp comprising:
 first and second substantially rigid arms;
 a base member connecting and supporting said arms in substantially parallel relationship;
 first and second clamping screws threadably engaging said first arm, said screws being spaced longitudinally of said first arm in parallel alignment with each other with their axes in a substantially common plane;
 a plurality of gripping screws threadably engaging said second arm, each of said screws having its gripping end directed toward said first arm; and load support means secured to said clamp substantially in said common plane.

2. A generally U-shaped clamp according to claim 1 wherein said load support means are offset in relation to the axes of said clamping screws whereby the load produces a different torque relative to each of them.

References Cited by the Examiner

UNITED STATES PATENTS

| | | | |
|---|---|---|---|
| 893,875 | 7/1908 | Schneider | 269—154 X |
| 1,252,638 | 1/1918 | Wiedeman. | |
| 2,285,928 | 6/1942 | Jensen | 24—125 X |
| 2,360,366 | 10/1944 | Renfroe | 294—104 |
| 2,440,820 | 5/1948 | Frank | 269—154 |
| 2,519,107 | 8/1950 | Brown. | |
| 2,520,448 | 8/1950 | Abegg. | |
| 2,636,770 | 4/1953 | Cornawell | 294—103 |
| 2,669,013 | 2/1954 | Wilson | 269—152 X |
| 2,816,792 | 12/1957 | Dixon | 294—103 |

FOREIGN PATENTS

| | | |
|---|---|---|
| 23,395 | 4/1930 | Australia. |
| 607 | 9/1948 | Great Britain. |

WILLIAM FELDMAN, *Primary Examiner.*

D. GRIFFIN, *Assistant Examiner.*